US007864718B2

(12) United States Patent
Huang et al.

(10) Patent No.: US 7,864,718 B2
(45) **Date of Patent: *Jan. 4, 2011**

(54) ECHO CANCELLATION DEVICE FOR FULL DUPLEX COMMUNICATION SYSTEMS

(75) Inventors: Chen-Chih Huang, Hsin-Chu Hsien (TW); Chih-Wen Huang, Kao-Hsiung Hsien (TW)

(73) Assignee: Realtek Semiconductor Corp., Science Park, HsinChu (TW)

(*) Notice: Subject to any disclaimer, the term of this patent is extended or adjusted under 35 U.S.C. 154(b) by 0 days.

This patent is subject to a terminal disclaimer.

(21) Appl. No.: 12/398,168

(22) Filed: Mar. 4, 2009

(65) Prior Publication Data

US 2009/0175157 A1 Jul. 9, 2009

Related U.S. Application Data

(63) Continuation of application No. 10/904,338, filed on Nov. 4, 2004, now Pat. No. 7,554,933, which is a continuation-in-part of application No. 10/709,935, filed on Jun. 7, 2004, now Pat. No. 7,304,961.

(30) Foreign Application Priority Data

Jan. 9, 2004 (TW) .............................. 93100571 A

(51) Int. Cl.
*H04B 3/20* (2006.01)
*H04B 3/30* (2006.01)
*H04B 1/10* (2006.01)
*H04M 9/08* (2006.01)

(52) U.S. Cl. ....................... 370/286; 370/293; 375/346; 379/406.01

(58) Field of Classification Search ......... 370/286–292; 375/254, 346, 220, 350; 379/406.01–406.16, 379/391–394
See application file for complete search history.

(56) References Cited

U.S. PATENT DOCUMENTS 3,942,095 A 3/1976 Togneri (Continued)

FOREIGN PATENT DOCUMENTS

TW 318989 11/1997

(Continued)

OTHER PUBLICATIONS

CA3130,CA3130A, Sep. 1998.

*Primary Examiner*—Tri H Phan
(74) *Attorney, Agent, or Firm*—Winston Hsu; Scott Margo

(57) ABSTRACT

An apparatus for echo cancellation in a transceiver of a full duplex communication system, where the transceiver includes a transmitter for transmitting a transmit signal and a receiver for receiving a receive signal, includes: an echo cancellation signal generator, coupled to the transmitter, for receiving the transmit signal and for generating an echo cancellation signal according to the transmit signal, wherein the echo cancellation signal reflects an effect of an impedance of a channel and a parasitic capacitor of the transceiver; and a calculation module coupled to the transmitter, the receiver, and the echo cancellation signal generator for receiving the receive signal and for canceling the echo of the receive signal according to the echo cancellation signal to generate an echo-cancelled signal, wherein the effect of the impedance of the channel and the parasitic capacitor of the transceiver in the echo-cancelled signal is reduced.

17 Claims, 5 Drawing Sheets

U.S. PATENT DOCUMENTS 4,602,133 A 7/1986 O'Neill
4,928,308 A * 5/1990 Roessler ................ 379/406.08
4,972,406 A * 11/1990 Dedic ......................... 370/286
4,972,436 A 11/1990 Halim
5,249,225 A * 9/1993 Williams .................... 379/404
5,287,406 A 2/1994 Kakuishi
5,291,466 A 3/1994 Kwak
5,463,695 A 10/1995 Werrbach
5,528,687 A 6/1996 Tanaka
5,581,166 A 12/1996 Eismann
5,586,181 A 12/1996 Kiko
5,694,474 A 12/1997 Ngo et al.
5,812,537 A 9/1998 Betts
5,960,077 A 9/1999 Ishii et al.
6,278,785 B1 8/2001 Thomasson
6,373,908 B2 4/2002 Chan
6,707,911 B1 * 3/2004 Daanen ................. 379/406.01
6,757,383 B1 * 6/2004 Joffe ..................... 379/406.01
6,775,529 B1 8/2004 Roo
6,836,544 B1 * 12/2004 Gupta ........................ 379/391
6,915,141 B2 7/2005 Loke
6,917,682 B2 * 7/2005 Vanderbauwhede et al. ..................... 379/406.01
6,937,104 B1 8/2005 Varadarajan
6,947,478 B1 9/2005 Hauptmann et al.
6,965,578 B1 11/2005 Kappes
6,980,644 B1 12/2005 Sallaway et al.
7,031,456 B2 * 4/2006 Dyer et al. .................. 379/398
7,139,342 B1 11/2006 Phanse
7,269,211 B2 9/2007 Lin
7,304,961 B2 12/2007 Huang
7,307,965 B2 12/2007 Huang
7,457,386 B1 11/2008 Phanse
2002/0101983 A1 8/2002 Lee
2003/0031139 A1 * 2/2003 Thilenius .................... 370/286
2003/0169875 A1 9/2003 Lee
2003/0214903 A1 11/2003 Lee
2005/0084003 A1 4/2005 Duron

FOREIGN PATENT DOCUMENTS

TW 507433 10/2002

* cited by examiner

ECHO CANCELLATION DEVICE FOR FULL DUPLEX COMMUNICATION SYSTEMS

CROSS REFERENCE TO RELATED APPLICATIONS

This application is a continuation of U.S. application Ser. No. 10/904,338, filed 4 Nov. 2004, entitled "ECHO CANCELLATION DEVICE FOR FULL DUPLEX COMMUNICATION SYSTEMS", which is itself a continuation-in-part of U.S. application Ser. No. 10/709,935 filed 7 Jun. 2004, entitled "ECHO CANCELLATION DEVICE FOR FULL DUPLEX COMMUNICATION SYSTEMS". Both applications are included herein by reference.

BACKGROUND OF THE INVENTION

1. Field of the Invention

The present invention relates to a full duplex communication system, and more particularly, to an echo cancellation device in a full duplex communication system.

2. Description of the Prior Art

As technology advances, network applications have become more and more popular. Network bandwidth requirements are also increasing as the transmission speed of data transmission standards such as Ethernet have raised from 10/100 Mps to above 1 Gbps.

Each channel of a gigabit Ethernet system simultaneously performs transmitting and receiving operations. When the channel is transmitting, the signals received from the channel are affected by the transmission and this phenomenon is known as echo impairment. In order to reduce echo impairment in communication systems, an echo cancellation device is included within the transceiver. Please refer to FIG. 1 showing an equivalent circuit diagram of a line driver with a conventional echo cancellation device. The transmitter of the gigabit Ethernet system can be implemented to be a voltage mode transmitter which includes a line driver in the transmitter section 110. In FIG. 1, Rp is a matching resistor used for impedance matching, Zo is the channel's load, Vi is a transmit signal output from a transmitter section (line driver) 110, and Vo is an input signal of the twisted pair. The conventional echo cancellation device regards the channel's load Zo as a pure load resistor Re and the resistance of Rp is therefore equal to that of Re in order to match the impedance. From the circuit diagram shown in FIG. 1, the following formula can be obtained:

$$Vo = \frac{Zo}{Zo + Rp} Vi \tag{1}$$

The channel's load Zo is seen simply as the load resistor Re, thus Zo=Re. By substituting this relationship into formula (1), the following formula is obtained:

$$Vo = \tfrac{1}{2} Vi \tag{2}$$

From formula (2), it can be seen that the influence at a receiver section 310 and caused by the transmit signal Vi output from the voltage-driving transmitter section 110 is ½ Vi. The conventional echo cancellation device is employed to generate an echo cancellation signal corresponding to the transmit signal. As such, the echo cancellation signal is ½ Vi and is followed by a subtractor to cancel the effect caused by the transmit signal in order to achieve echo cancellation.

However, a parasitic capacitance Ce effect is unavoidable in practical implementation. If the effective output impedance of the channel is seen purely as the load resistor Re, the echo cannot be effectively reduced to the lowest level. In other words, the conventional echo cancellation device 106 can only reduce DC component of the echo but not eliminate echo residue at high frequencies.

SUMMARY OF THE INVENTION

It is therefore one of the objectives of the claimed invention to provide an echo cancellation device used in a full duplex communication system to solve the above-mentioned problem.

An apparatus for echo cancellation in a transceiver of a full duplex communication system, where the transceiver comprises a transmitter for transmitting a transmit signal and a receiver for receiving a receive signal, comprises: an echo cancellation signal generator, coupled to the transmitter, for receiving the transmit signal and for generating an echo cancellation signal according to the transmit signal, wherein the echo cancellation signal reflects an effect of an impedance of a channel and a parasitic capacitor of the transceiver; and a calculation module coupled to the transmitter, the receiver, and the echo cancellation signal generator for receiving the receive signal and for canceling the echo of the receive signal according to the echo cancellation signal to generate an echo-cancelled signal, wherein the effect of the impedance of the channel and the parasitic capacitor of the transceiver in the echo-cancelled signal is reduced.

A method for eliminating an echo of a receive signal in a transceiver of a full duplex communication system, where the transceiver comprises a transmitter for transmitting a transmit signal and a receiver for receiving a receive signal, comprises: receiving the transmit signal from the transmitter; generating an echo cancellation signal according to the transmit signal; adjusting the echo cancellation signal such that the echo cancellation signal reflects an effect of an impedance of a channel and a parasitic capacitor of the transceiver; receiving the receive signal from the receiver; and canceling the echo of the receive signal according to the echo cancellation signal to generate an echo-cancelled signal, wherein the effect of the impedance of the channel and the parasitic capacitor of the transceiver in the echo-cancelled signal is reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
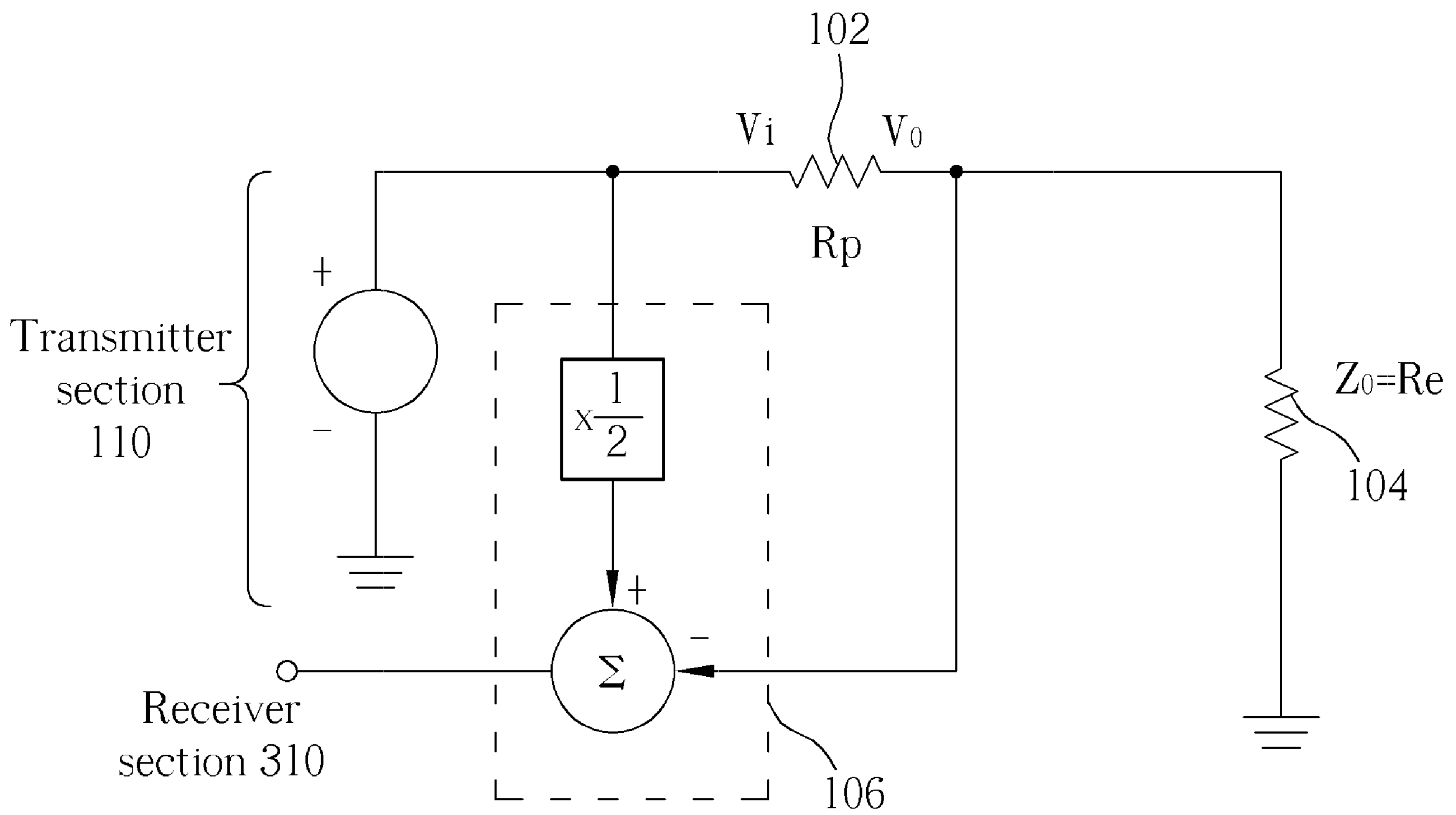
FIG. 1 is an equivalent circuit diagram of a line driver with a conventional echo cancellation device.
Figure 2:
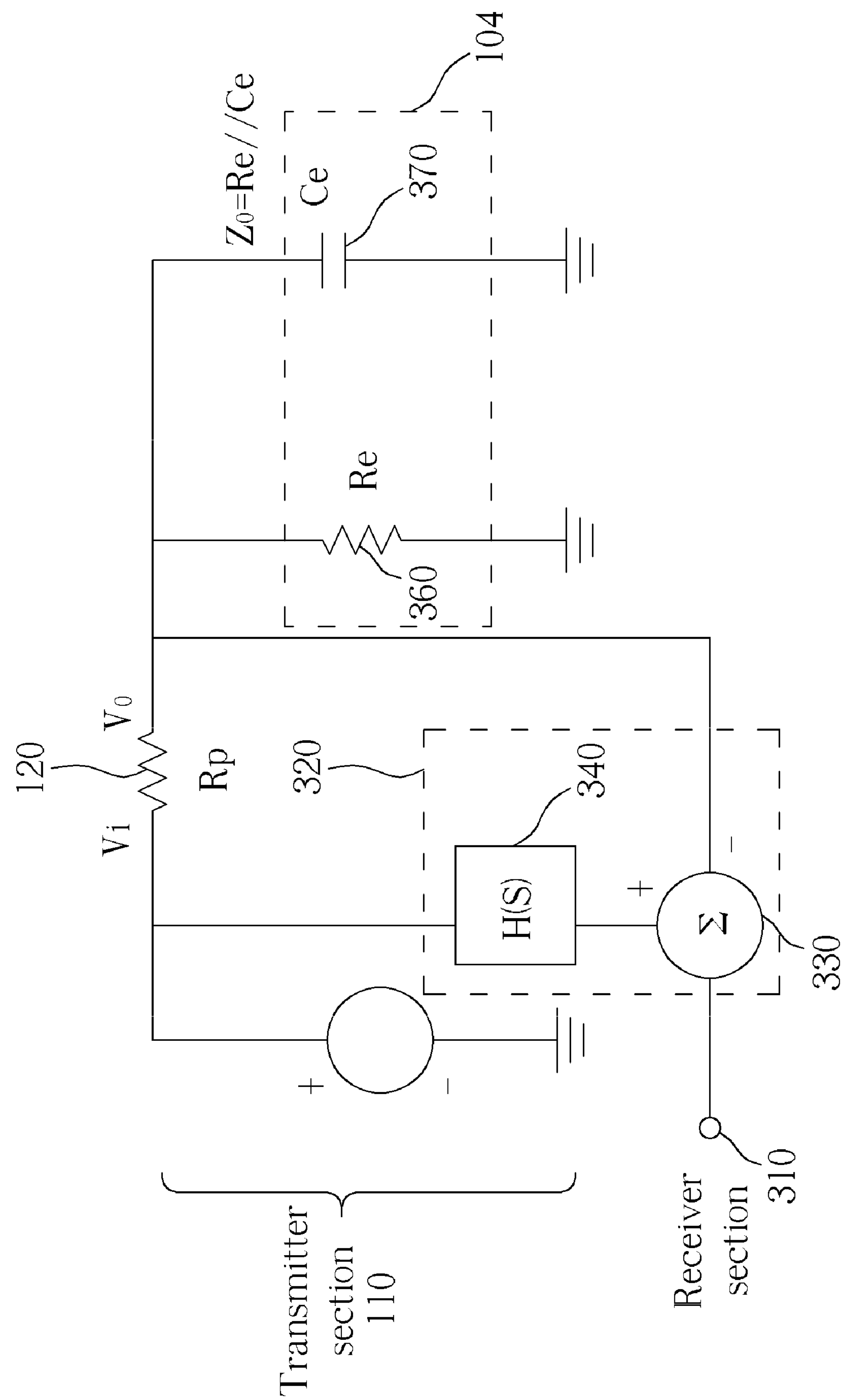
FIG. 2 is a schematic diagram of a line driver according to a first embodiment of the present invention.

Please refer to FIG. 2. FIG. 2 depicts a schematic diagram of a full-duplex Ethernet transmitter according to a first embodiment of the present invention. The transmitter of the gigabit Ethernet system can be implemented to be a voltage mode transmitter which includes a line driver in the transmitter section 110 in this embodiment. Since the unavoidable parasitic capacitance effect of practical implementations is considered in the first embodiment of the present invention, the equivalent output impedance Zo is modified to be a parallel connection of a load resistor Re 360 and a parasitic capacitor Ce 370. That means Zo=Re//Ce. Please note, the value of the load resistor Re 360 is determined from the matching resistor Rp 102 and the equivalent resistance of the channel. Substituting this relationship into formula (1) obtains a transfer function between Vo and Vi:

$$H(s) = \frac{Re}{Rp + Re + sReRpCe} \tag{3}$$

From formula (3), it can be seen that if the relation between Vo and Vi satisfies the transfer function H(s), then the echo can be completely cancelled.

As shown in FIG. 2, the echo cancellation device of the embodiment of the present invention comprises an echo cancellation signal generator 340 coupled to the transmitter section 110 for generating an echo cancellation signal according to the transmit signal, a load resistor and a parasitic capacitor of the transceiver base on the formula (3) shown above; and a calculation module 330 coupled to the transmitter section 110, the receiver section 310, and the echo cancellation signal generator 340 for outputting the receive signal according to the echo cancellation signal and a far-end signal. The echo cancellation signal generator 340 can be implemented using either analog means or digital means.

Figure 3:
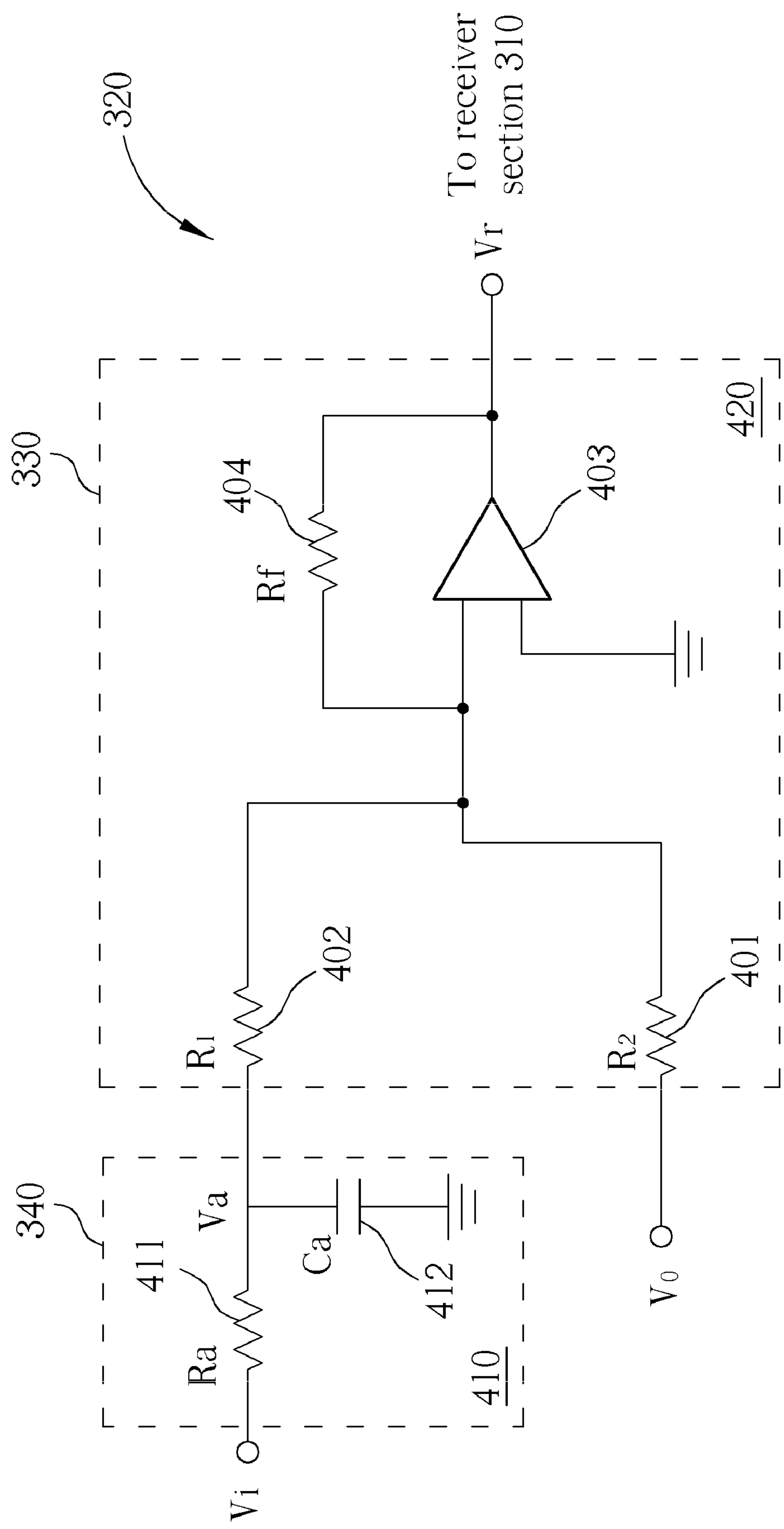
FIG. 3 is a schematic diagram of an analog echo cancellation signal generator of FIG. 2 according to the embodiment of the present invention.

One analog implementation means that can be employed to implement the echo cancellation signal generator 340 is an RC network low pass filter 410, as shown in FIG. 3. The RC network low pass filter 410 comprises a resistor Ra 411 and a capacitor Ca 412. The RC network low pass filter 410 is used for generating an echo cancellation signal Va according to the signal Vi. The RC network low pass filter 410 transmits the echo cancellation signal to an OP amplifier 403 via a resistor R1 402. The signal Vo is transmitted to the OP amplifier 403 via a resistor R2 401. A resistor Rf 404 has two terminals, one being coupled to the input end of the OP amplifier 403 and the other being coupled to the output end of the OP amplifier 403. The resistor Rf 404 controls the gain between the transmitter section and the receiver section 310. The echo cancellation device of the present invention utilizes the OP amplifier 403 to simultaneously perform low pass filtering and signal subtraction. According to FIG. 3, following formulas are obtained:

$$Va = \frac{R1}{Ra + R1 + sCaRaR1} Vi \tag{4}$$

$$Va \cdot \frac{Rf}{R1} + Vo \cdot \frac{Rf}{R2} = -Vr \tag{5}$$

By letting Vr=0 and combining the above-mentioned formulas (2), (4) and (5), the following formula is obtained:

$$\frac{1}{Ra + R1 + sCaRaR1} = \frac{-Re}{(Re + Rp + sCeReRp)R2} \tag{6}$$

Thus, the echo can be completely cancelled when the echo cancellation device of the present invention satisfies the two following formulas:

$$CaRaR1 = CeRpR2 \tag{7}$$

$$Ra + R1 = \left(\frac{Rp}{Re} + 1\right)R2 \tag{8}$$

According to the present invention, the effect of echo impairment at the receiver section 310 is minimized by utilizing the RC network low pass filter 410 to satisfy the formulas (7) and (8) and adjusting the capacitance of the capacitor Ca. The capacitor of FIG. 4 can be a metal-stacked-layer capacitor or a parasitic capacitor, and the resistor can be a MOS transistor. The resistance of the MOS transistor can be controlled by adjusting its gate voltage Vg.

Figure 4:
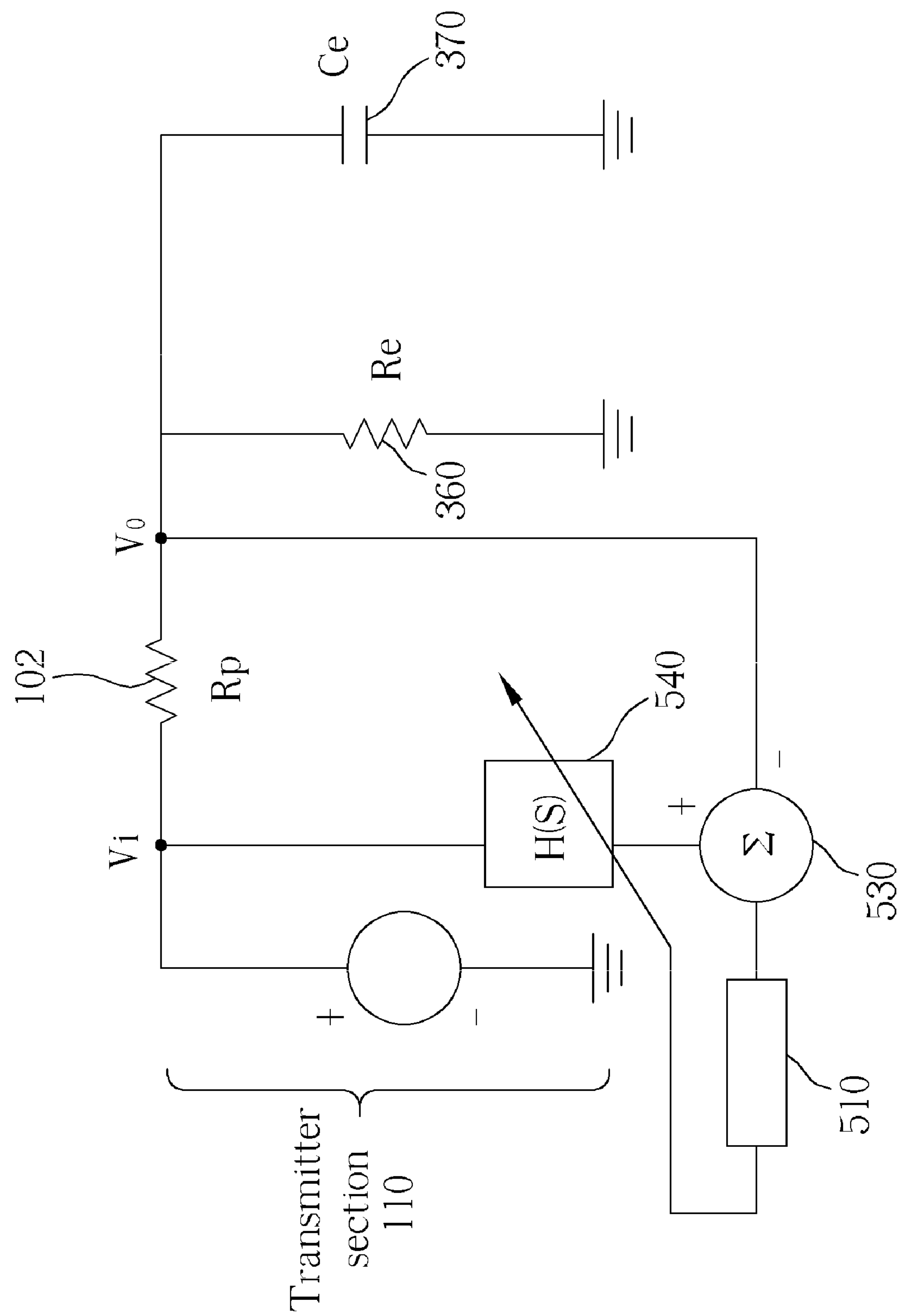
FIG. 4 is a schematic diagram of a line driver according to a second embodiment of the present invention.
Figure 5:
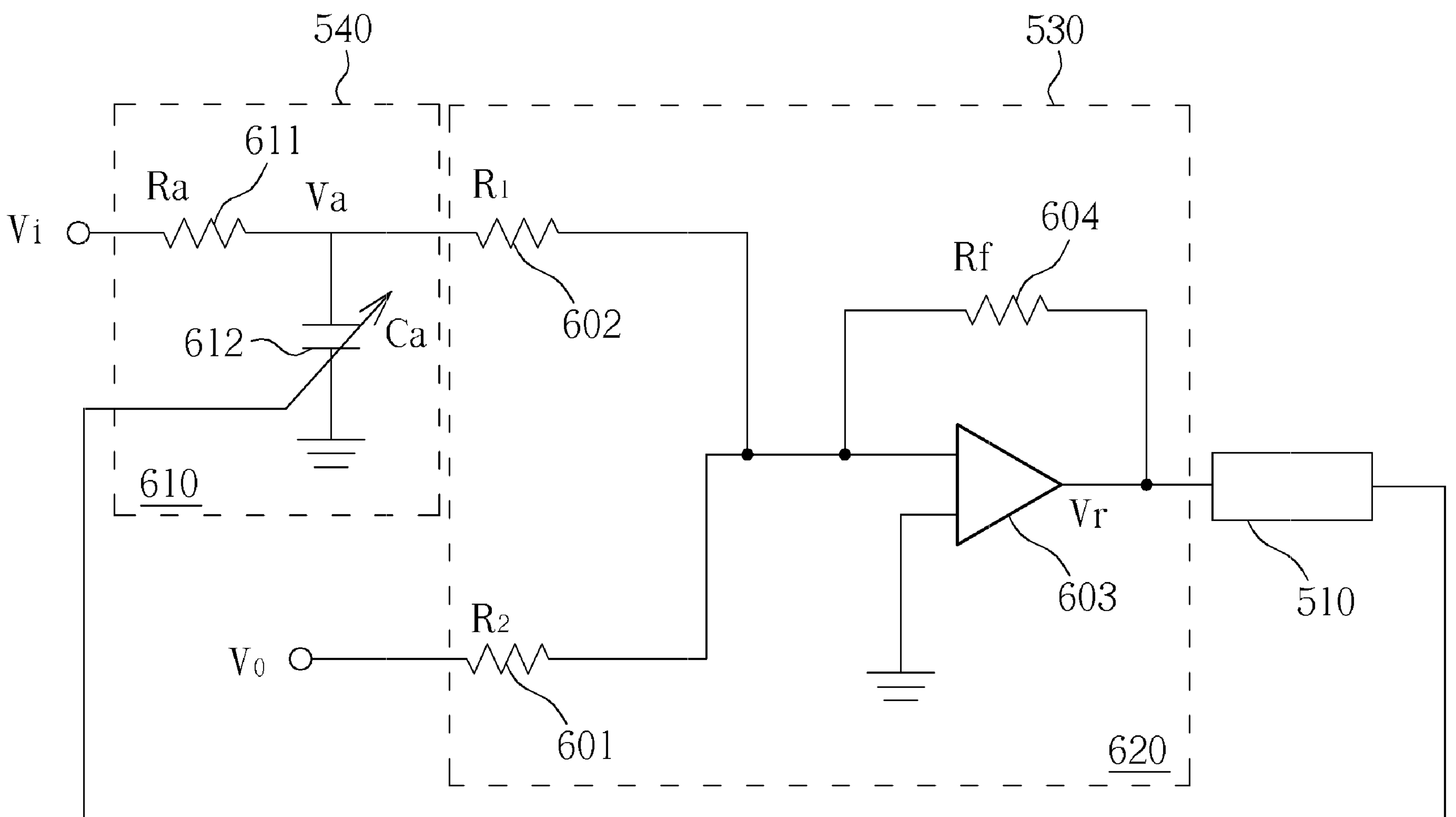
FIG. 5 is a schematic diagram of an analog echo cancellation signal generator of FIG. 4 according to the embodiment of the present invention.

FIG. 4 and FIG. 5 are block diagrams of the fast Ethernet device according to a second embodiment of the present invention. In practical implementations, the capacitance of the parasitic capacitor Ce 370, the resistance of the channel's equivalent resistor Re 360, and the impedance of the matching resistor Rp 102 are affected by the operating environment, temperature, manufacturing deviations, or similar variations. Therefore, the values will fluctuate and change when transmitting/receiving data. In order to more precisely eliminate the echo, in the second embodiment of the present invention, the echo cancellation device further comprises an echo residue detector 510 for detecting the echo residue at the receiver section. The echo residue detector 510 generates a control signal according to the detected echo residue and outputs the control signal to the echo cancellation signal generator 540 in order to form a feedback loop.

For example, if the echo cancellation signal generator 540 is a digital low pass filter as shown in FIG. 4, the echo cancellation device can utilize the control signal to dynamically adjust the finite impulse response (FIR) coefficients or the infinite impulse response (IIR) coefficients of the digital low pass filter according to the different characteristics of the circuit components and the network environment in order to obtain optimal echo cancellation performance. In another embodiment, if the echo cancellation signal generator 540 is an RC network low pass filter 610 as shown in FIG. 5, the control signal can be employed to dynamically adjust the capacitance of the capacitor to change the RC value of the RC network low pass filter 610 according to the different characteristics of the circuit components and the network environment in order to obtain optimal echo cancellation performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for echo cancellation in a transceiver of a full duplex communication system, the transceiver comprising a transmitter for transmitting a transmit signal and a receiver for receiving a receive signal, the apparatus comprising:

an echo cancellation signal generator, coupled to the transmitter, for receiving the transmit signal and for generating an echo cancellation signal according to the transmit signal, wherein the echo cancellation signal reflects an effect of an impedance of a channel and a parasitic capacitor of the transceiver; and a calculation module coupled to the transmitter, the receiver, and the echo cancellation signal generator, for receiving the receive signal and for canceling the echo of the receive signal according to the echo cancellation signal to generate an echo-cancelled signal, wherein the effect of the impedance of the channel and the parasitic capacitor of the transceiver in the echo-cancelled signal is reduced.

2. The apparatus of claim 1, wherein the calculation module is for eliminating at least high frequency components of the echo of the receive signal.

3. The apparatus of claim 1, wherein the transmitter comprises a voltage-mode transmitter.

4. The apparatus of claim 3, wherein the voltage-mode transmitter comprises a line driver.

5. The apparatus of claim 1, wherein the echo cancellation signal generator is a filter.

6. The apparatus of claim 5, wherein the filter is a digital filter.

7. The apparatus of claim 5, wherein the filter is an RC network filter.

8. The apparatus of claim 5, wherein the filter is a low pass filter.

9. The apparatus of claim 1, wherein the echo cancellation device further comprises an echo-residue circuit, coupled to the echo cancellation signal generator, for outputting a control signal such that an echo-residue of the echo-cancelled signal is reduced.

10. The apparatus of claim 9, wherein the echo cancellation signal generator adjusts the echo cancellation signal according to the control signal.

11. The apparatus of claim 9, wherein the echo cancellation signal generator includes an RC network filter and the echo cancellation signal is adjusted through adjusting the equivalent capacitance of the RC network filter.

12. The apparatus of claim 1, wherein the echo cancellation signal generator comprises an RC network filter which comprises a MOS transistor.

13. A method for eliminating an echo of a receive signal in a transceiver of a full duplex communication system, the transceiver comprising a transmitter for transmitting a transmit signal and a receiver for receiving a receive signal, the method comprising:

receiving the transmit signal from the transmitter;

generating an echo cancellation signal according to the transmit signal;

adjusting the echo cancellation signal such that the echo cancellation signal reflects an effect of an impedance of a channel and a parasitic capacitor of the transceiver;

receiving the receive signal from the receiver; and canceling the echo of the receive signal according to the echo cancellation signal to generate an echo-cancelled signal, wherein the effect of the impedance of the channel and the parasitic capacitor of the transceiver in the echo-cancelled signal is reduced.

14. The method of claim 13, further comprising:

generating a control signal such that an echo-residue of the echo-cancelled signal is reduced.

15. The method of claim 14, wherein the step of generating the control signal further comprises:

detecting the echo residue of the echo-cancelled signal and generating the control signal; and reducing the echo-residue of the echo-cancelled signal according to the control signal.

16. The method of claim 13, wherein at least one high frequency component of the echo of the receive signal is reduced in the step of canceling the echo of the receive signal.

17. The method of claim 13, wherein the transmitter comprises a voltage-mode transmitter.

* * * * *